US011288573B2

(12) United States Patent
Wu

(10) Patent No.: US 11,288,573 B2
(45) Date of Patent: Mar. 29, 2022

(54) METHOD AND SYSTEM FOR TRAINING AND NEURAL NETWORK MODELS FOR LARGE NUMBER OF DISCRETE FEATURES FOR INFORMATION RERTIEVAL

(71) Applicant: Baidu USA LLC, Sunnyvale, CA (US)

(72) Inventor: Shuang Wu, Fremont, CA (US)

(73) Assignee: BAIDU USA LLC, Sunnyvale, CA (US)

(*) Notice: Subject to any disclaimer, the term of this patent is extended or adjusted under 35 U.S.C. 154(b) by 1412 days.

(21) Appl. No.: 15/147,823

(22) Filed: May 5, 2016

(65) Prior Publication Data

US 2017/0323199 A1    Nov. 9, 2017

(51) Int. Cl.
*G06N 3/08* (2006.01)
*G06F 16/00* (2019.01)
*G06F 16/951* (2019.01)
*G06N 3/04* (2006.01)

(52) U.S. Cl.
CPC .............. *G06N 3/08* (2013.01); *G06F 16/00* (2019.01); *G06F 16/951* (2019.01); *G06N 3/04* (2013.01)

(58) Field of Classification Search
CPC ............ G06N 3/08; G06N 3/04; G06N 20/00; G06N 3/0454; G06F 16/00; G06F 16/951
See application file for complete search history.

(56) References Cited

U.S. PATENT DOCUMENTS

| | | | |
|---|---|---|---|
| 6,269,351 B1 * | 7/2001 | Black | G06F 16/30 706/15 |
| 6,304,864 B1 * | 10/2001 | Liddy | G06F 16/9535 706/15 |
| 7,743,013 B2 * | 6/2010 | Mityagin | G06F 16/93 |
| 8,239,394 B1 * | 8/2012 | Hogue | G06F 16/9014 707/754 |
| 8,266,506 B2 * | 9/2012 | Hao | H03M 13/51 714/777 |
| 9,165,305 B1 * | 10/2015 | Chandra | G06F 12/06 |
| 9,390,086 B2 * | 7/2016 | Lisuk | G06F 3/04842 |

(Continued)

FOREIGN PATENT DOCUMENTS

CA      2424588 A1 *   4/2002   ............. G06Q 30/02

OTHER PUBLICATIONS

Efficient and robust associative memory from a generalized Bloom filter (Year: 2012).*

(Continued)

*Primary Examiner* — Eric Nilsson
*Assistant Examiner* — Ababacar Seck
(74) *Attorney, Agent, or Firm* — Womble Bond Dickinson (US) LLP

(57) ABSTRACT

According to one embodiment, a first set of features is received, where each of the features in the first set being associated with a predetermined category. A bloom filter is applied to the first set of features to generate a second set of features. A neural network model is trained by applying the second set of features to a first layer of nodes of the neural network model to generate an output, the neural network model including a plurality of layers of nodes coupled to each other via a connection. The output of the neural network model is compared with a target value associated with the predetermined category to determine whether the neural network model satisfies a predetermined condition.

21 Claims, 10 Drawing Sheets

(56) References Cited

U.S. PATENT DOCUMENTS

| | | | |
|---|---|---|---|
| 9,985,984 B1* | 5/2018 | Chavez | H04L 63/1441 |
| 10,356,111 B2* | 7/2019 | Di Pietro | H04L 47/41 |
| 10,373,047 B2* | 8/2019 | Higgins | G06N 3/04 |
| 2005/0049913 A1* | 3/2005 | Huddleston | G06K 9/6228 |
| | | | 706/13 |
| 2009/0276385 A1* | 11/2009 | Hill | G06N 3/08 |
| | | | 706/25 |
| 2013/0232097 A1* | 9/2013 | Shiv | G06N 3/04 |
| | | | 706/20 |
| 2013/0290339 A1* | 10/2013 | LuVogt | G06Q 10/10 |
| | | | 707/740 |
| 2014/0372349 A1* | 12/2014 | Driscoll | G06F 16/951 |
| | | | 706/12 |
| 2015/0347585 A1* | 12/2015 | Klotz | G06F 16/24578 |
| | | | 707/706 |
| 2016/0026913 A1* | 1/2016 | Moon | G06N 3/04 |
| | | | 706/25 |
| 2016/0054940 A1* | 2/2016 | Khoueir | G06F 12/06 |
| | | | 706/15 |
| 2016/0321540 A1* | 11/2016 | Towal | G06N 3/04 |
| 2016/0342692 A1* | 11/2016 | Bennett | G06F 16/9535 |

OTHER PUBLICATIONS

Membership Classification using Integer Bloom Filter Cheng et al. (Year: 2013).*

Fast Approach to Simultaneously Determine Existence and Classification for String Patterns in a Payload Ma et al. (Year: 2011).*

Robust Bloom Filters for Large Multilabel Classification Tasks Cisse et al. (Year: 2013).*

A Personalized Search Engine Research Based on Bloom Filter Pang et al. (Year: 2011).*

* cited by examiner

METHOD AND SYSTEM FOR TRAINING AND NEURAL NETWORK MODELS FOR LARGE NUMBER OF DISCRETE FEATURES FOR INFORMATION RERTIEVAL

FIELD OF THE INVENTION

Embodiments of the present invention relate generally to searching content. More particularly, embodiments of the invention relate to training and creating neural network models and using the same for information retrieval.

BACKGROUND

The Web contains a vast amount of information and locating a desired portion of the information can be challenging. This problem is compounded because the amount of information on the Web and the number of new users at Web searching are growing rapidly. Search engines attempt to return hyperlinks to Web pages in which a user is interested. Generally, search engines base their determination of the user's interest on search terms (a search query) entered by the user. The goal of the search engine is to provide links to relevant results to the user based on the search query. Typically, the search engine accomplishes this by matching the terms in the search query to a corpus of Web pages. The content items are then returned to a search requester as a search result. Dependent upon the quality of the search engine, the content items returned to the user may or may not be what the user actually wanted.

In order to provide a better search result, a number of methods have been utilized to determine the satisfaction or hits of search results. Neural networks (NNs) have been utilized in many areas, such as image understanding, speech recognition, and natural language processing, etc., as part of analyzing search results. However, when a data set consists of a large number of sparse and discrete features, neural network model training is slow to converge and achieves lower accuracy. This is especially true when using deep neural networks (DNNs) due to a number of hidden layers and a large amount of input observations.

In machine learning, neural networks are a family of models used to estimate or approximate functions that can depend on a large number of inputs and are generally unknown. Neural networks are generally presented as systems of interconnected "neurons" which exchange messages between each other. The connections have numeric weights that can be tuned based on experience, making neural networks adaptive to inputs and capable of learning.

For example, a neural network for handwriting recognition is defined by a set of input neurons which may be activated by the pixels of an input image. After being weighted and transformed by a function (determined by the network's designer), the activations of these neurons are then passed on to other neurons. This process is repeated until finally, an output neuron is activated. This determines which character was read. Like other machine learning methods, i.e., systems that learn from data, neural networks have been used to solve a wide variety of tasks that are hard to solve using ordinary rule-based programming, including computer vision and speech recognition.

Typically, a neural network includes an array of input nodes, one or more layers of hidden nodes, and one or more output nodes. Each of input nodes is connected with each of the hidden nodes, and each of the hidden nodes is connected to each of the output nodes. A DNN includes multiple layers of hidden nodes as shown in FIG. 1. Referring to FIG. 1, in this example, neural network 180 includes four layers of hidden nodes 181-184 in a hierarchical structure. Each of input nodes 191 is connected to first layer of nodes 181. Each of lower nodes is connected with each of an immediate upper nodes, finally leading to output nodes 192. Each connection is associated with a weight. As described above, the learning process will be performed for each of the connections between a lower node and an upper node by adjusting a weight associated with the corresponding connection. When a number of input nodes 191 becomes large, the processing resources (e.g., processor, memory) required to process all connections amongst all nodes would become enormous, and the process would be very time consuming and inefficient.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

When training a DNN model with a large number of discrete features, the number of weights connecting features to first hidden layer nodes is linearly proportional to the feature number. Consequentially, most computation time and storage cost are spent on these weights. On the other hand, in many problem settings, these discrete features are highly sparse, i.e. the number of features per training example is much lower than the total number of features. According to some embodiments, a bloom filter, a data structure conventionally used to probabilistically encode a set of membership information, is utilized to reduce computation and storage cost of DNN by representing discrete and sparse features in a lower dimensional space. This leads to faster convergence in model training and a smaller model, i.e., a model with a smaller memory footprint. This technique can be generically applied to other input features and DNN's prediction target in a wide range of tasks and applications where a DNN model is appropriate.

Figure 2:
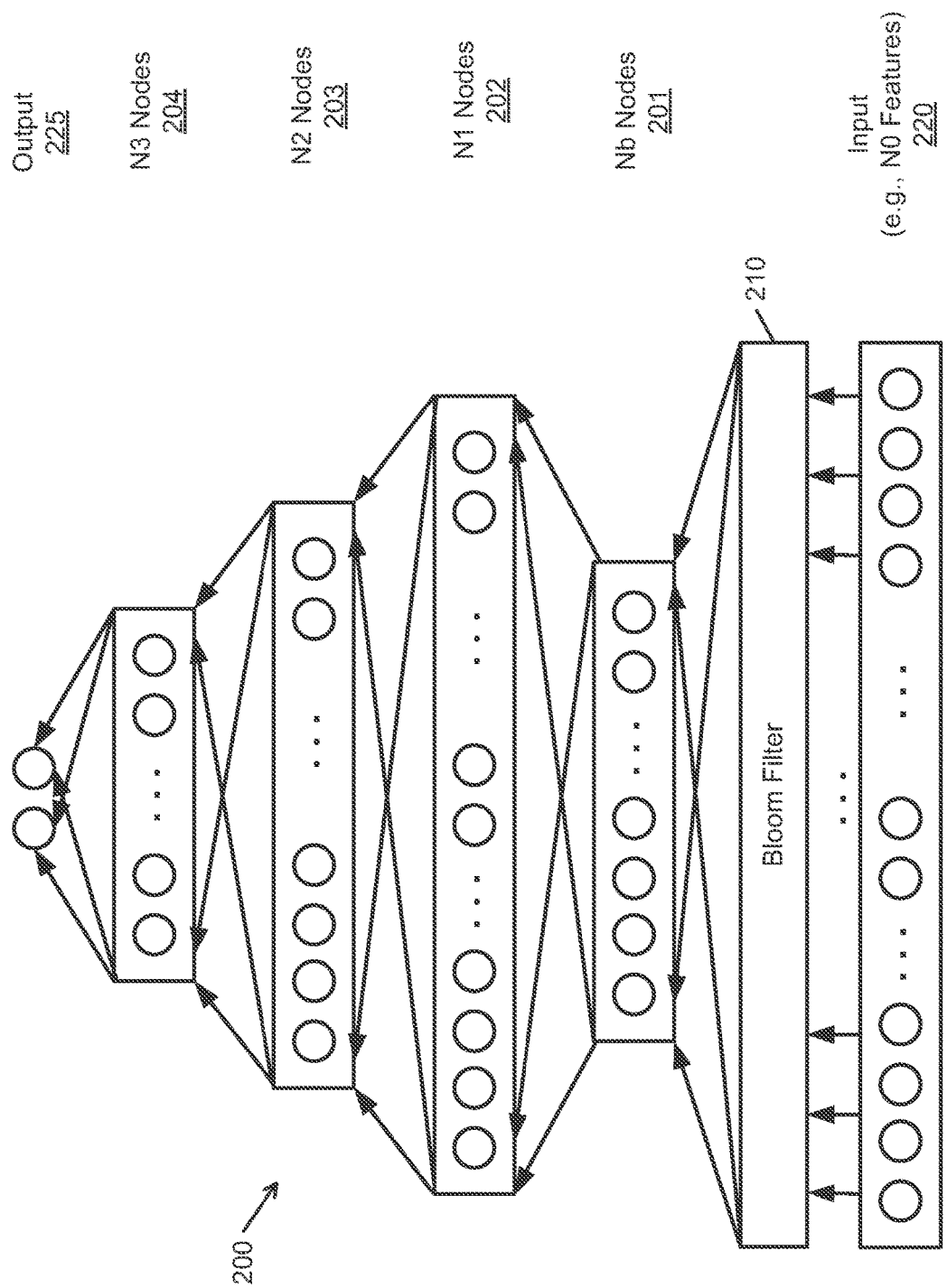
FIG. 2 is a block diagram illustrating a neural network model which may be used with an embodiment of the invention.

FIG. 2 is a block diagram illustrating an example of a neural network model according to one embodiment of the invention. Referring to FIG. 2, neural network 200 includes one or more hidden layers of nodes 201-204. In this example, neural network 200 includes 4 hidden layers of nodes, however, more or fewer layers may also be applicable. In addition, a bloom filter 210 is provided to interface the first hidden layer 201 and input layer of nodes 220. Bloom filter 210 is configured to reduce or condense a number of nodes in input layer 220 to a fewer number of nodes to be provided to the first hidden layer 201.

According to one embodiment, prior to feeding a first set of features 220 to a neural network model 200 for training purposes, bloom filter 210 is applied to the first set of features 220 to generate a second set of features (not shown). The neural network model 200 is one of the neural network models to be trained, each neural network model corresponding to one of the predetermined categories. The first set of features 220 has been condensed by bloom filter 210 into the second set of features that have a fewer number of features than the first set. The second set of features is then provided to a first hidden layer 201 of nodes of the neural network model 200 being trained to generate output 225, where the neural network model 200 includes one or more hidden layers of nodes 201-204. In general, a regular neural network model contains one hidden layer of nodes, while a deep neural network model (e.g., weights) contains multiple hidden layers of nodes. The output 225 is then compared with a target value associated with the predetermined category. The parameters of the neural network model and the parameters of the bloom filter may be iteratively adjusted and trained until the output of the neural network model falls within a predetermined proximity of the target value. For a set of predetermined categories, a set of neural network models and a set of associated bloom filters may be generated using respective sets of known features.

Figure 1:
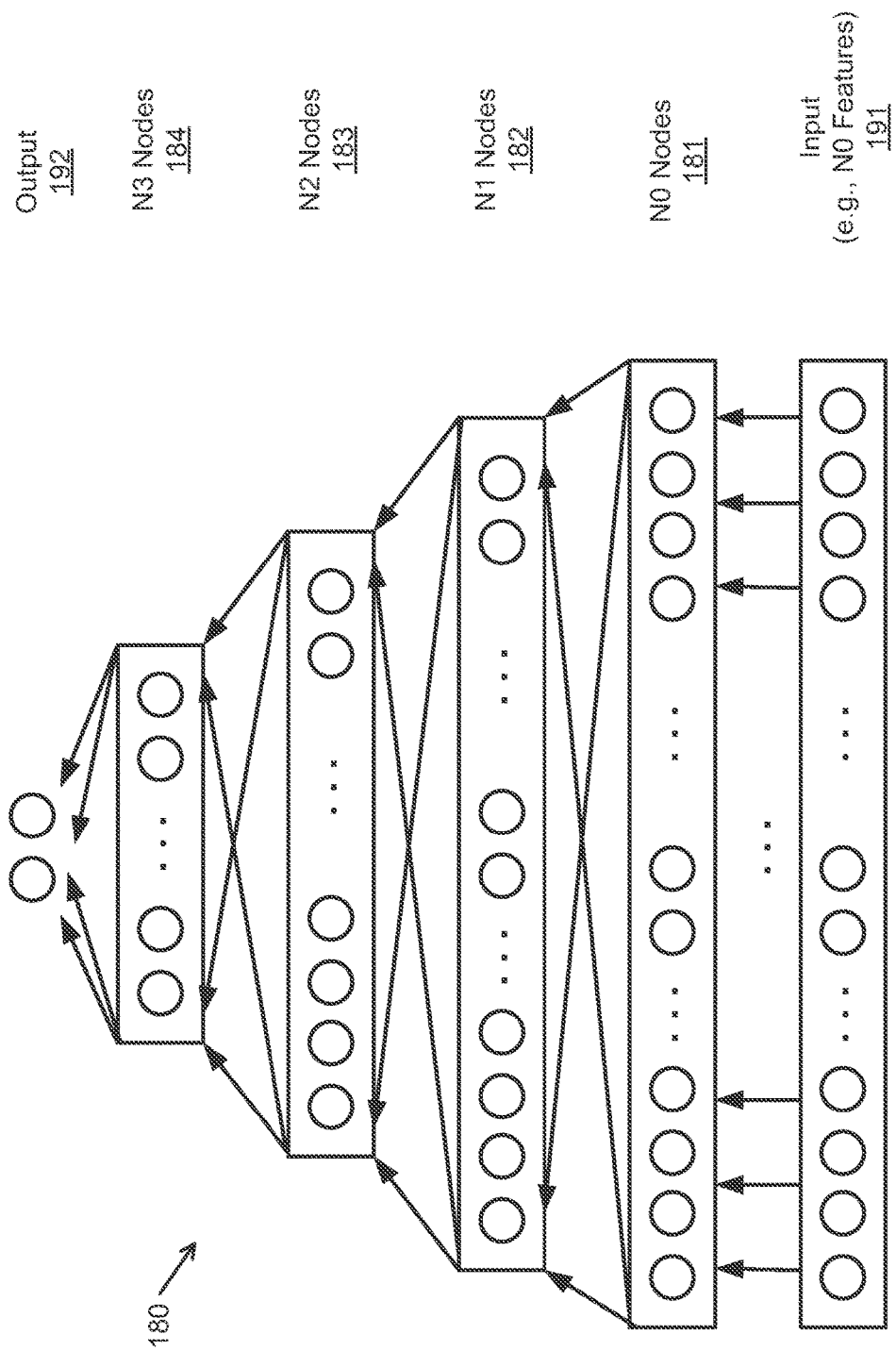
FIG. 1 is a block diagram illustrating a typical neural network model.

With bloom filter 210, the number of nodes in layer 201 is lower than layer 181 of FIG. 1. As a result, the processing resources (e.g., memory, processor) required to train and/or utilize neural network 200 can be significantly reduced, and the efficiency can be greatly improved. DNNs with a large number of sparse input features have a corresponding wide input layer, on top of which normally there are several hidden layers with increasingly smaller number of nodes. For example, referring back to FIG. 1, given a DNN with $N_0=1,000,000$ input features (e.g., layer 181), first hidden layer with $N_1=1,000$ nodes (e.g., layer 182), second hidden layer with $N_2=100$ nodes (e.g., layer 183), third hidden layer with $N_3=10$ nodes (e.g., layer 184), and 2 output nodes 192. The total number of model parameters (node weights) is 1,000,000*1,000+1000*100+100*10+10*2=1,000,101,020.

With a bloom layer between input feature layer 220 and first hidden layer 202, referring now to FIGS. 1 and 2, the mapping from input features to the bloom-filter layer is deterministic and thus needs not to be trained. The number of nodes $N_b$ of layer 201 can be tuned and is much smaller than input feature number $N_0$ 220. For example, if $N_b=3,000$ in layer 201, then the new DNN with bloom-filter layer has 3,000*1000+1000*100+100*10+10*2=3,101,020 model parameters, about 0.3% of the original parameter number. This greatly improves from the original DNN by condensing the information flow from input feature layer 220 to upper layers, resulting in fast convergence and higher model prediction accuracy.

A bloom filter is a space-efficient probabilistic data structure that is used to test whether an element is a member of a set. False positive matches are possible, but false negatives are not, thus a bloom filter has a 100% recall rate. In other words, a query returns either "possibly in set" or "definitely not in set". Elements can be added to the set, but not removed. The more elements that are added to the set, the larger the probability of false positives. A bloom filter uses m bits to store set membership of n elements with false positive rate p:

$$m = -\frac{n \ln p}{(\ln 2)^2}.$$

It can be used to represent sparse and discrete features from training examples, which can be considered as a subset of n features sampled from the full feature set of $N_0$ elements. Due to feature sparsity of $m \sim n \ll N_0$, before training a DNN on dataset with $N_0$ discrete features, each training example is first encoded by a bloom filter with m bits. This step essentially reduces input dimension from $N_0$ to m. By tuning parameter p, one can make this mapping from original $N_0$-dimensional feature space to the new m-dimensional feature space to be bijection with a high probability. Afterwards, the DNN training process proceeds as usual, albeit with a smaller input dimension. This is a generic nonlinear feature mapping method that can be used in other deep learning algorithms such as recurrent neural networks (RNN).

Neural network 200 together with bloom filter 210 can be utilized in a variety of applications in content searching fields. For example, neural network 200 can be utilized to categorize a user (e.g., user type) who initiates a search for content. According to one embodiment, when a search query is received from a user device of a user, a first set of features are determined based on the search query, the user device, the user, as well as other related information (e.g., history log, etc.). A bloom filter of a neural network model is applied to the first set of features to generate a second set of features. The second set of features are then fed to a neural network model of a particular category to derive an output value representing a likelihood (e.g., probability) that the user is associated with that particular category. A search is then conducted in a content database based on the search query and the user category of the user, such that better content can be served to target the user. The first set of features may be fed to different neural models and their respective bloom filters to determine whether the user is associated with any of the categories corresponding to the neural network models. The outputs of the neural network models are compared to determine one or more final categories for searching purposes.

Alternatively, a neural network model can be used to rank content items of a search result based on the features associated with content items of the search results and user information (e.g., user profile, user device information) of the user. The content items are then sorted based on the rankings that the user is more likely interested in receiving. Furthermore, a neural network model can be used to determine whether a user interaction of a user with a particular content item has occurred (e.g., whether the user has clicked on that particular content item presented to the user) based on the features associated with the user and the content item. The input features can represent a combination of any one or more of a user identifier (ID), a content ID identifying a content item, a device ID of a user device (e.g., IP address), content description (e.g., keywords), search queries, a user agent information (e.g., browser application), a Web domain, or a universal resource locator (URL), etc.

Bloom filter 210 is utilized to determine whether any of the above sparse features exists, which is then represented by a smaller set of features 201. There may be some false positives, however, given the sparse features in the searching space, the impact of such false positives can be negated. In other words, the benefits of improving processing efficiency and reducing processing resources required significantly outweighs the detriments of having false positives. By properly tuning the parameters of the bloom filter, the balance between having accurate predictions of the NN models and improving the processing efficiency can be achieved.

Figure 3A:
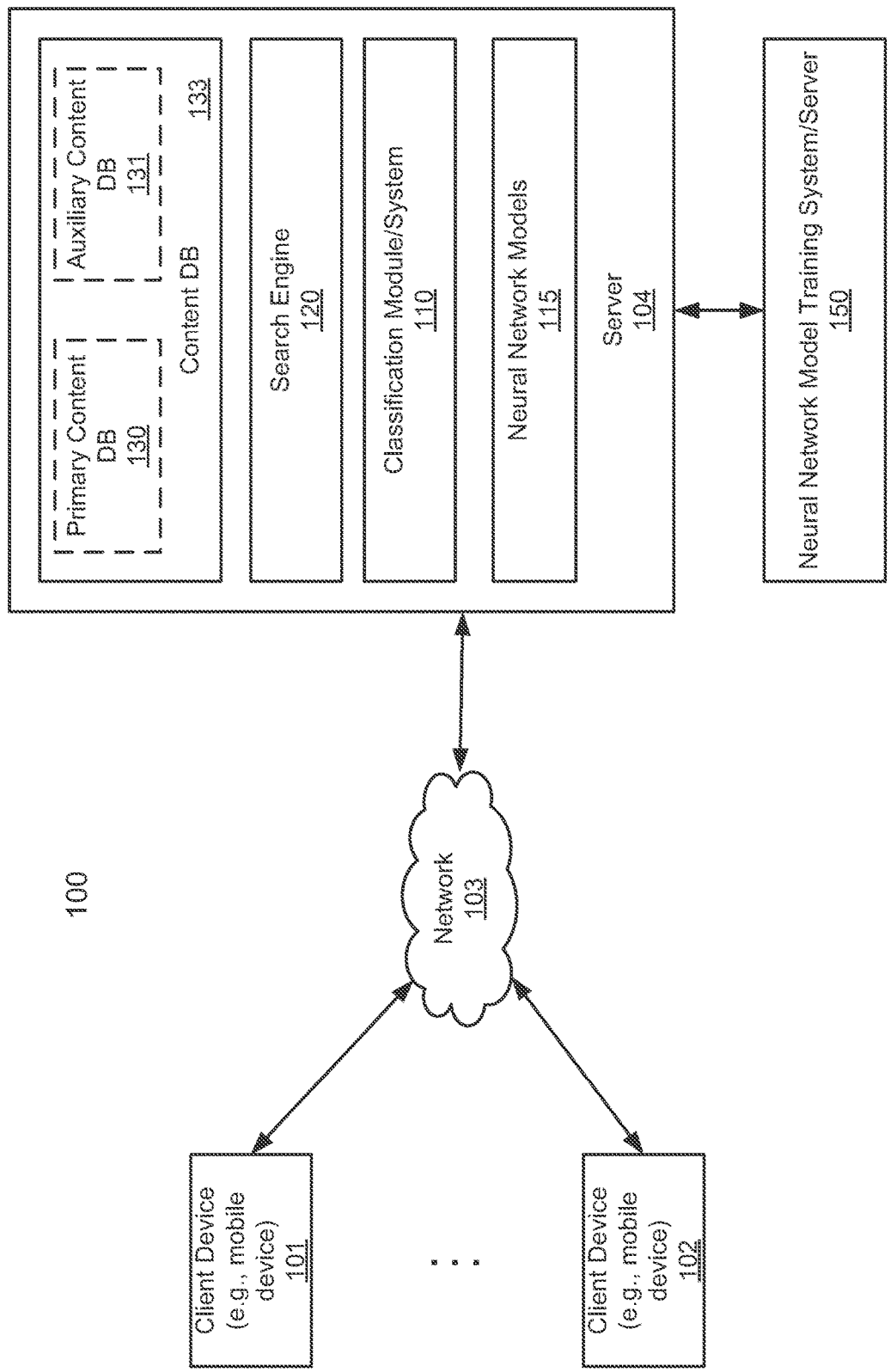
FIGS. 3A and 3B are block diagram illustrating an example of system configuration for searching content according to some embodiments of the invention.
Figure 3B:
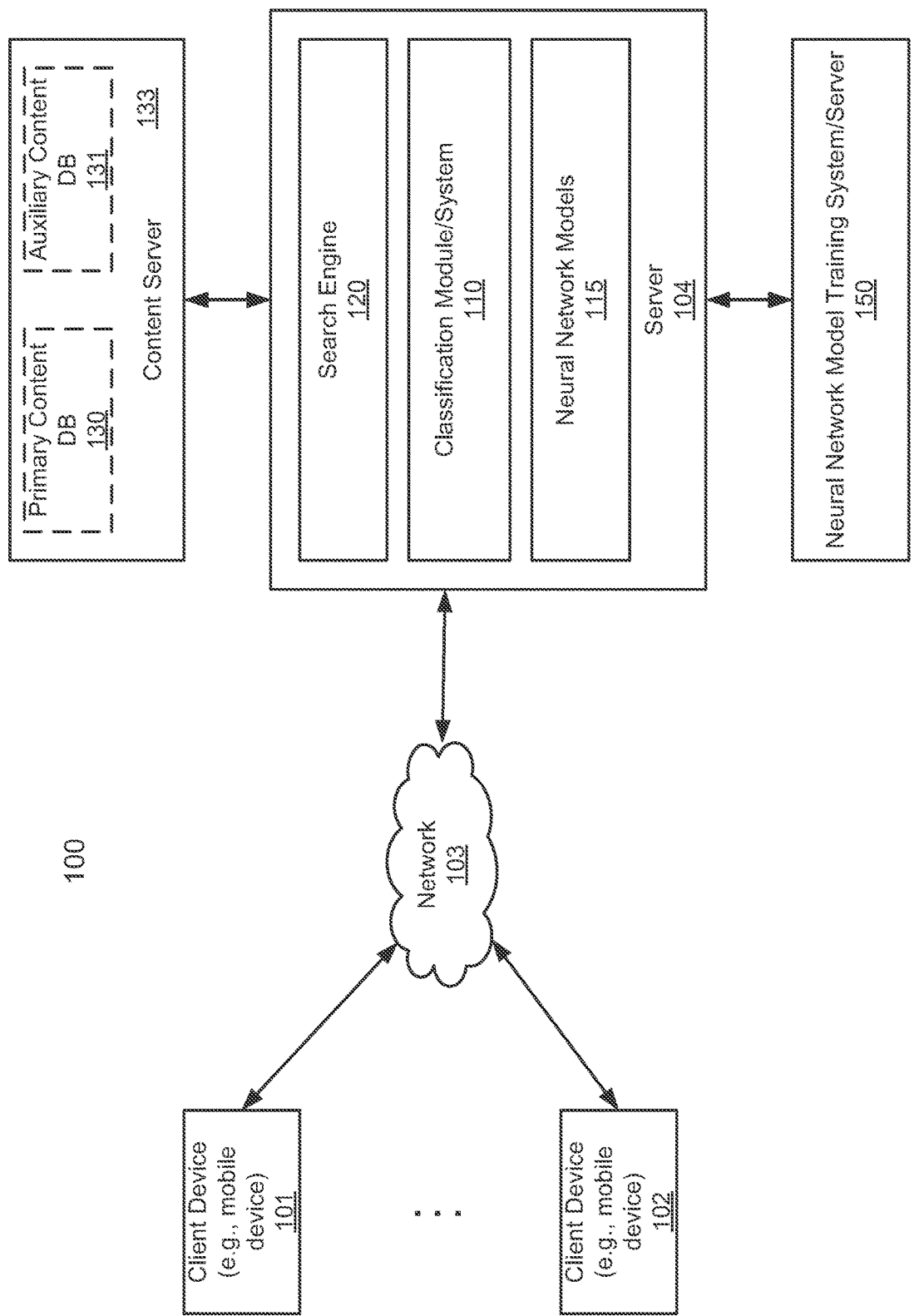

FIGS. 3A and 3B are block diagram illustrating an example of system configuration for searching content according to some embodiments of the invention. Referring to FIG. 3A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or clusters of servers, such as Web or cloud servers, application servers, backend servers, or a combination thereof. In one embodiment, server 104 includes, but is not limited to, search engine 120, classification module or system 110, and neural network models 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

Referring back to FIG. 3A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

Server 104 further includes classification module or system 110 to classify users who initiated search queries or contents searched by a user, using one or more classification models 115, which may be neural network models as described above. Classification module 110 can determine a type or category of a user based on user information (e.g., user ID, user device, prior user interactive history). The category or type of a user can be utilized to determine what the user likely does or what information the user would like to receive (e.g., user intent). Based on the user classification, a search can then be performed in content database 133, for example, for particular types of content associated with the user classification (e.g., types or categories of users). As a result, a better search result (e.g., special content or sponsored content specifically configured for certain types of users or user intent) can be provided to the users and satisfaction of the users can be improved. Alternatively, classification module 110 can classify the content using classification models 115. The outputs of classification models 115 can be used to rank the content items. Furthermore, classification module 110 can determine whether a user interaction (e.g., click) has occurred on a particular content item (e.g., Ads conversion), using classification models 115.

Classification models 115 (also simply referred to as models) are trained and generated by classification model training system 150 (also simply referred to as a training system), which may be implemented as a separate server over a network or alternatively be integrated with server 104. Models 115 may be trained and generated offline by training system 150, loaded into server 104, and periodically updated from training system 150. Each of models 115 corresponds to one of a number of predetermined categories, classes of users, or types of information.

In response to a search query received from a client device of a user such as client device 101, the search query is fed into each of the models 115. Each of models 115 provides an indicator indicating a likelihood the user is associated with a predetermined category corresponding to that particular model. In other words, each of models 115 predicts based on the search query whether the user is likely interested in a particular category of information associated with that particular model. In one embodiment, each of models 115 provides a probability that the user is interested in receiving information of the corresponding category. Based on the probabilities provided by models 115, user classification or user intent is determined, for example, based on the category with the highest probability. Thereafter, certain types of content can be identified and returned to the user based on the user classification or user intent (e.g., targeted content), which may reflect what the user really wants to receive.

According to one embodiment, in response to a search query, search engine 120 performs a search in primary content database 130 to identify and retrieve a list of general content items. In addition, classification system 110 classifies the user based on the search query using one or more classification models 115 determine a category or class of the user or category or class of information sought by the user, which may represent a user intent of the user. Based on the user classification, a search may be performed in auxiliary content database 131 to identify and retrieve a list of special content items (e.g., sponsored content). Thereafter, a search result having both the general and special content items is returned to the user. Here, the special content items are specific content targeting the user based on the user intent, which may be more accurate or closer to what the user really wants.

Alternatively, a neural network model can be used to rank content items of a search result based on the features associated with content items of the search results and user information (e.g., user profile, user device information) of the user. The content items are then sorted based on the rankings that the user is more likely interested in receiving. Furthermore, a neural network model can be used to determine whether a user interaction of a user with a particular content item has occurred (e.g., whether the user has clicked on that particular content item presented to the user) based on the features associated with the user and the content item. The input features can represent a combination of any one or more of a user identifier (ID), a content ID identifying a content item, a device ID of a user device (e.g., IP address), content description (e.g., keywords), search queries, a user agent information (e.g., browser application), a Web domain, or a universal resource locator (URL), etc.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server. Other architectures or configurations may also be applicable. For example, as shown in FIG. 1B, content database 133 may be maintained and hosted in a separate server as a content server over a network. Server 133 may be a Web server, an application server, or a backend server. Content server 133 may be organized and provided by the same entity or organization as of server 104. Alternatively, content server 133 may be maintained or hosted by separate entities or organizations (e.g., third-party content providers), which are responsible for collecting contents in content databases 130-131 and their metadata. Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary content server.

Figure 4:
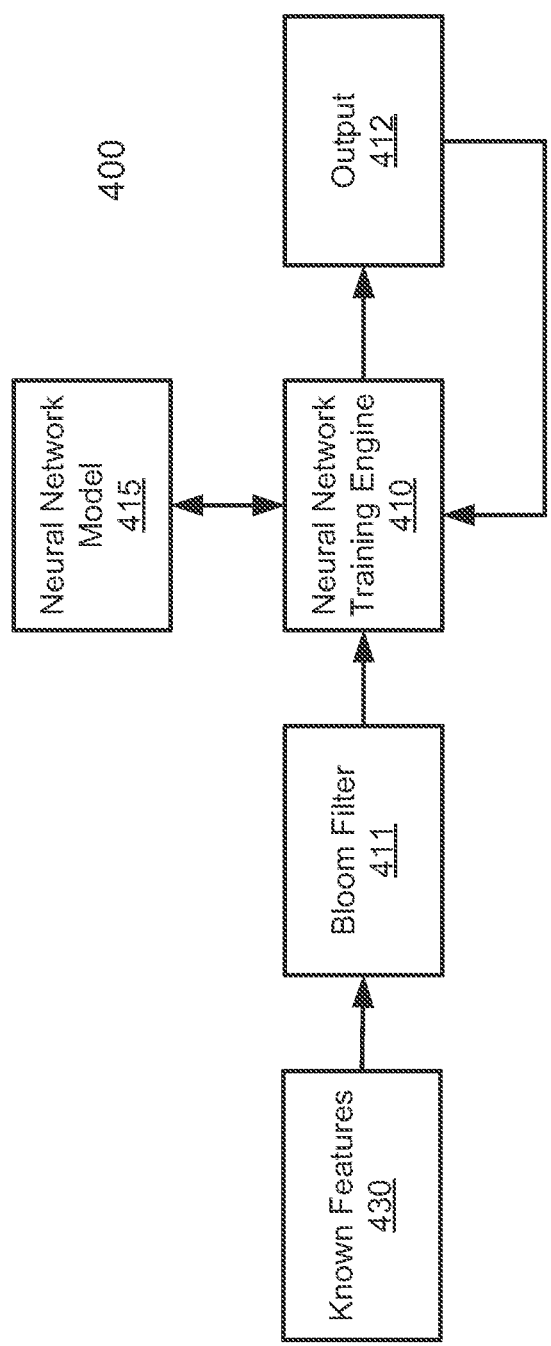
FIG. 4 is a block diagram illustrating an example of a classification model training system according to one embodiment of the invention.

FIG. 4 is a block diagram illustrating an example of a classification model training system according to one embodiment of the invention. System 400 may be implemented as part of model training system or server 150 of FIGS. 3A-3B. Referring to FIG. 4, according to one embodiment, system 400 includes model training engine 410 (also referred to as a training system/module, which may be implemented in software, hardware, or a combination thereof. For example, model training engine 410 may be implemented in software loaded in a memory and executed by a processor (not shown). For a given NN model 415 to be trained, a set of known features 430 is provided to bloom filter 411 to condense the set of features 430 to generate a new set of features having fewer number of features. The condensed set of features is then fed into NN model 415 and trained by training engine 410. Output 412 is then generated, where output 412 is compared with a target value to determine whether NN model 415 is accurate. If it is determined the NN model 415 does not satisfy a predetermined requirement, one or more parameters of bloom filter 411 may be adjusted and NN model 415 is retrained, until the NN model 415 satisfies the predetermined requirement.

Figure 5:
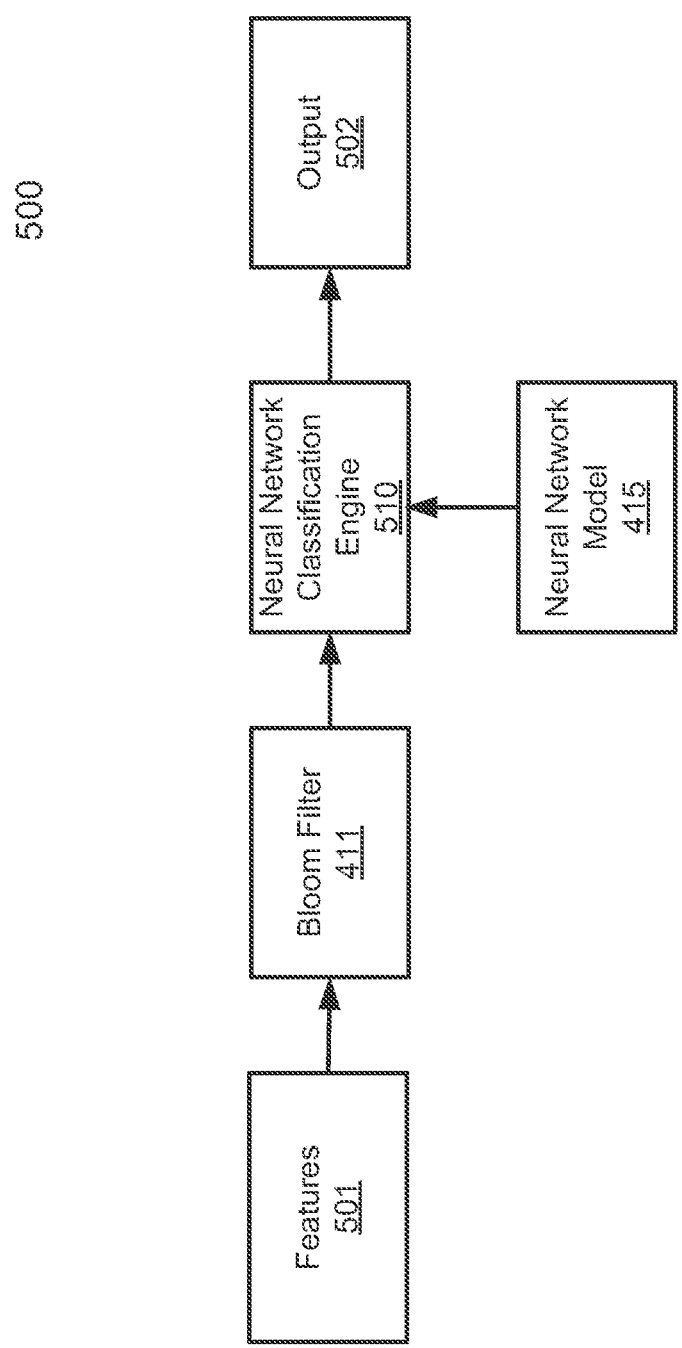
FIG. 5 is a block diagram an example of a classification system according to one embodiment of the invention.

FIG. 5 is a block diagram an example of a classification system according to one embodiment of the invention. System 500 may be implemented as part of classification system 110 of FIGS. 3A-3B. Referring to FIG. 5, according to one embodiment, system 500 includes NN classification engine 510, which may be implemented in software, hardware, or a combination thereof. In one embodiment, when a set of features 501 is received for classification, features 501 is fed into bloom filter 411 corresponding to NN model 415. The number of features 501 is reduced or condensed as a result. The condensed features are then provided to NN model 415 by NN classification engine 510 to generate output 502.

Features 501 may be obtained from a search query initiated from a user device of a user, including search query, user information, user device information, or prior user interactive information, etc. Output 502 may represent a user type or category of users. Based on the user category, a target search may be conducted. Alternatively, features 501 may be extracted from content items that are identified and retrieved from a content database based on a search query. NN classification engine 510 can classify the content items using NN model 415. Output 502 may be a score representing a likelihood that a particular content item is interesting to a particular user. Output 502 for each of the content items may be used to rank the content item. A search result may include a list of content item ranked and sorted based on the classification. Note that NN classification engine 510 and NN training engine 410 may be the same engine to train a NN model and classify features using the NN model.

Figure 6:
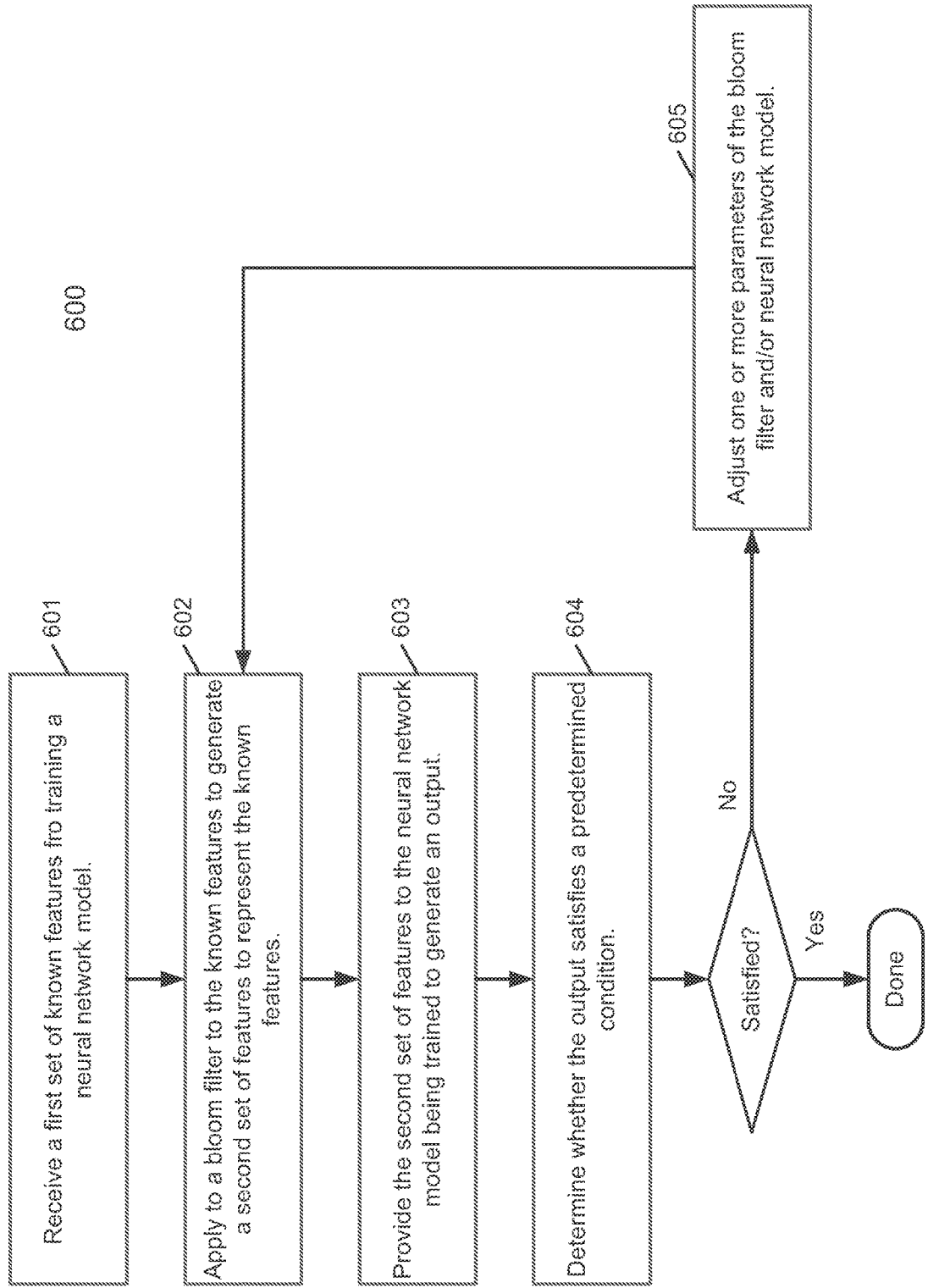
FIG. 6 is a flow diagram illustrating a process of training classification models according to one embodiment of the invention.

FIG. 6 is a flow diagram illustrating a process of training classification models according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by training system 150 of FIGS. 3A-3B. Referring to FIG. 6, at block 601, processing logic receives a first set of features, where each of the features in the first set is associated with a predetermined category. The features are known features associated with a known category or target. At block 602, processing logic applies a bloom filter to the known features to generate a second set of features. The second set of features are condensed features that represent the first set of features. As described above, there may be some false positives, however, given the sparse features in a content search space, such false positives can be negated.

At block 603, the second set of features are provided to a neural network model being trained. The second set of features may be fed to the visible layer of nodes of the neural network model, where the neural network model may include one or more hidden layers of nodes. An output is generated. At block 604, processing logic determines whether the output satisfies a predetermined condition or a target value (e.g., probability) that was set for the neural network model. If it is determined the output does not satisfy the predetermined condition or target, at block 605, certain parameters of the bloom filter and/or the neural network model may be adjusted, and the above operations may be iteratively performed to fine tune the bloom filter and/or the neural network model. For example, some parameters of the bloom filter may be modified such that the bloom filter may generate a different amount of features, similar to adjusting the condensed rate of the conversion. In addition, at least some of the weights of connections amongst the nodes of the neural network model may also be adjusted or "learned" to provide a better output, for example, using a machine-learning algorithm.

Figure 7:
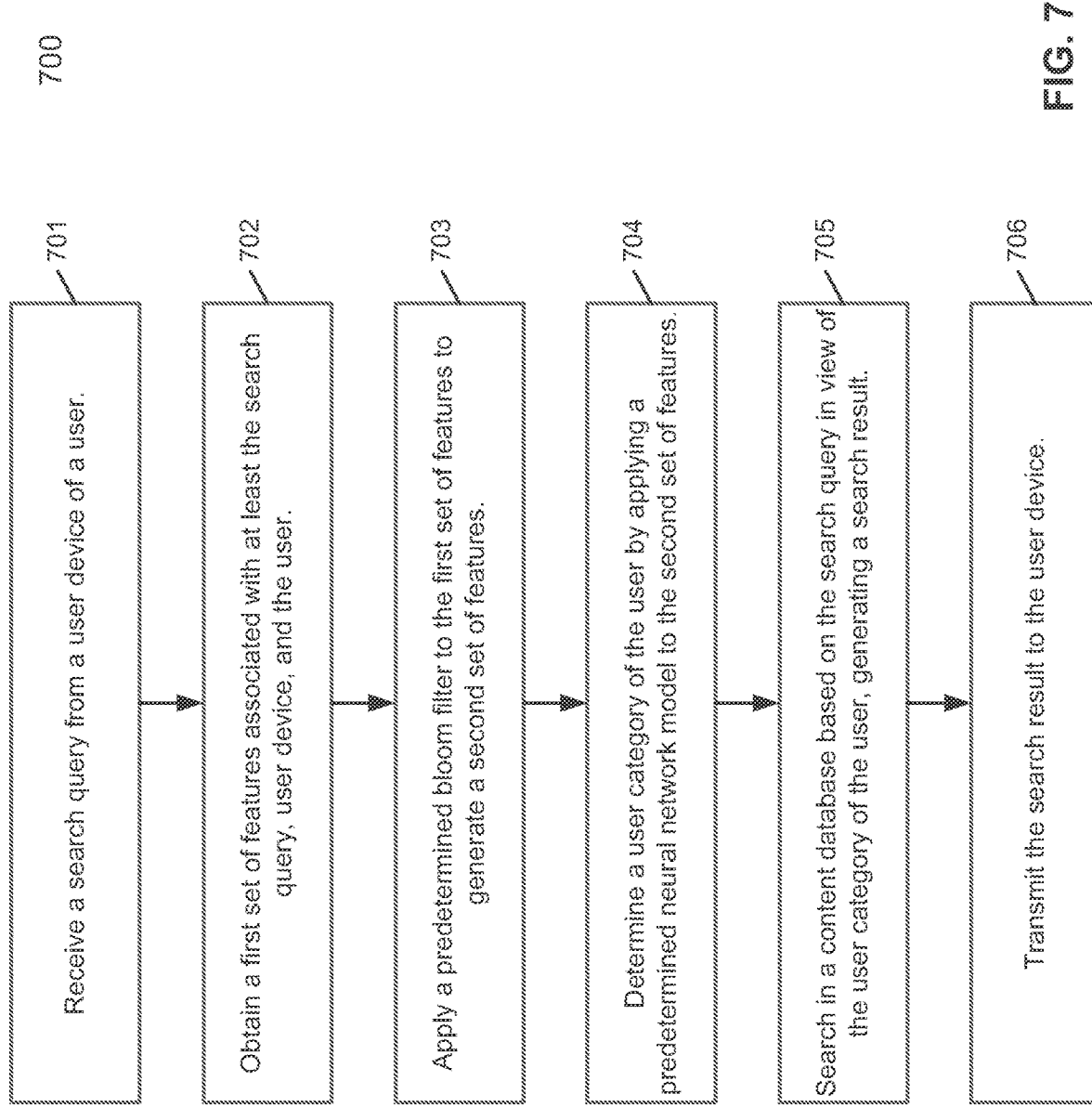
FIG. 7 is a flow diagram illustrating a process of classifying users using a classification model according to one embodiment of the invention.

FIG. 7 is a flow diagram illustrating a process of classifying users using a classification model according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by classification system 110 of FIGS. 3A-3B. Referring to FIG. 7, at block 701, processing logic receives a search query from a user device of a user, where the search query includes one or more keywords. At block 702, processing logic obtains a first set of features associated with at least the search query, the user device, and user information (e.g., user profiling information, prior user browsing history). At block 703, the processing logic applies a predetermined bloom filter to the first set of features to generate a second set of features. The second set of features are condensed features that represent the first set of features.

At block 704, the processing logic determines a user category of the user by applying a predetermined neural network model to the second set of features. An output is generated from the neural network mode, where the output represents the user category associated with the user. The output may include a score or value representing a category of information or content that the user is more likely interested in receiving. For example, the output may represent a likelihood (e.g., probability) that the user is interested in receiving content in a particular category associated with the neural network model and/or the bloom filter. At block 705, processing logic searches in a content database based on the search query in view of the user category of the user to generate a search result having a list of content items. The content database may store certain types of content items that are associated with the user category (e.g., targeted content such as sponsored content or Ads). At block 706, the search result is then returned to the user device of the user.

Note that multiple neural network models (and their associated bloom filters) may be applied to the features to generate multiple outputs corresponding to multiple categories as category candidates. Based on the outputs of the neural network models, one or more final category candidates may be selected for searching purposes. A user may be determined to be interested in receiving content of multiple categories using different neural network models and their respective bloom filters.

Figure 8:
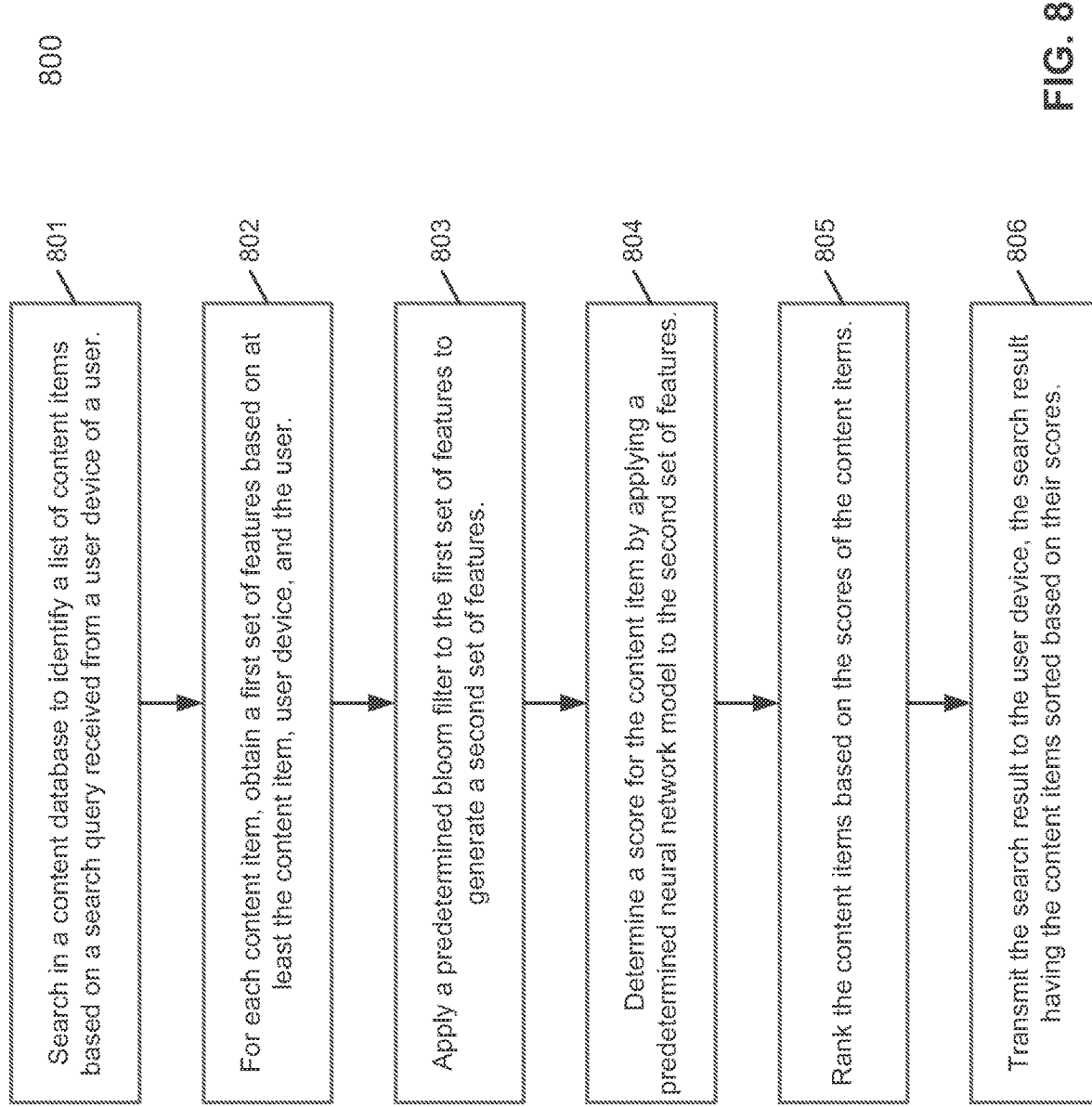
FIG. 8 is a flow diagram illustrating a process of classifying content using a classification model according to one embodiment of the invention.

FIG. 8 is a flow diagram illustrating a process of classifying content using a classification model according to one embodiment of the invention. Process 800 may be performed by processing logic that includes hardware (e.g. circuitry, dedicated logic, etc.), software (e.g., embodied on a non-transitory computer readable medium), or a combination thereof. For example, process 800 may be performed by classification system 110 of FIGS. 3A-3B. Referring to FIG. 8, at block 801, processing logic searches in a content database to identify a list of content items, in response to a search query received from a user device of a user. At block 802, for each of the content items, processing logic obtains a first set of features based on at least the content item, the user device, and the user (e.g., user profile and prior history). At block 803, processing logic applies a bloom filter to the first set of features to generate a second set of features, which is a condensed set of features representing the first set. At block 804, processing logic determines a score for the content item by applying a predetermined neural network model to the second set of features. The score may represent a likelihood (e.g., probability) or how confident (e.g., confidence score) that the content item belongs to a particular category associated with the neural network model. At block 805, the content items are ranked based on the outputs of the content items generated from the neural network model. At block 806, a search result is transmitted to the user device, where the search result includes the content items sorted based on the outputs of the neural network model.

Again note that multiple neural network models (and their associated bloom filters) may be applied to the features to generate multiple outputs corresponding to multiple categories as category candidates. Based on the outputs of the neural network models, one or more final category candidates may be selected for ranking purposes. A content item may be associated with multiple categories using different neural network models and their respective bloom filters, which may have an impact regarding how the content items are ranked and/or sorted.

Figure 9:
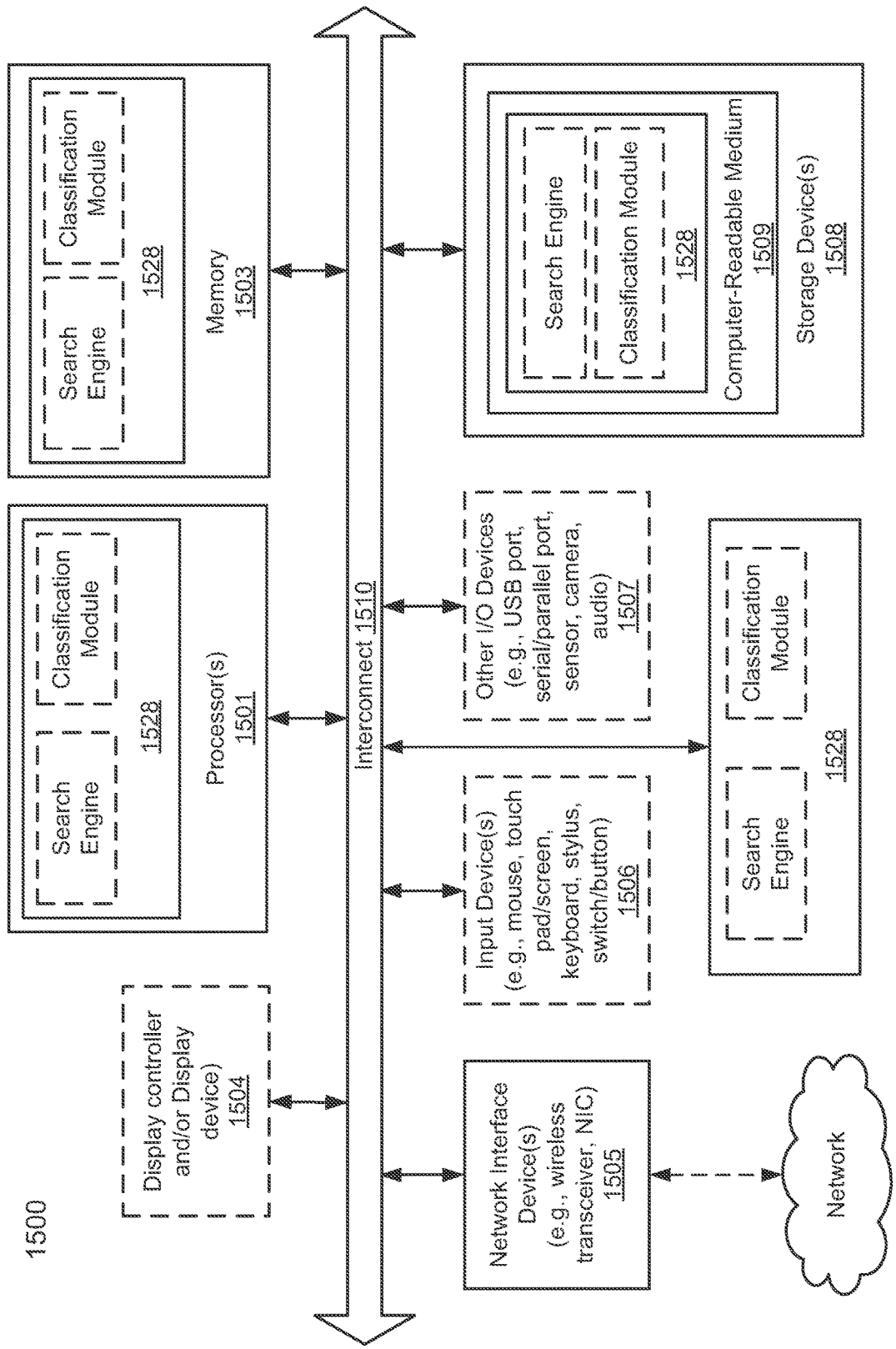
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, a client device or a server described above, such as, for example, server 104, content server 133, classification model training system 150 as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for generating neural network models, the method comprising:
  receiving a first set of features at an input layer of a neural network model, each of the features in the first set being associated with a predetermined category;
  applying a bloom filter coupled between the input layer and a first hidden layer of the neural network model to the first set of features to generate a second set of features, each of the features in the second set representing a combination of two or more features in the first set, wherein a number of nodes in the first hidden layer is fewer than a number of nodes in the input layer;
  training the neural network model by applying the second set of features to the first hidden layer of nodes of the neural network model to generate an output, the neural network model including a plurality of layers of nodes coupled to each other via a connection;
  comparing the output of the neural network model with a target value associated with the predetermined category to determine whether the neural network model satisfies a predetermined condition,
  wherein the neural network model together with the bloom filter is used to determine a category of a user based on a search query received from the user for content delivery, including
  obtaining a third set of features based on the search query, device information of a user device, and user information of the user;
  applying the bloom filter to the third set of features to generate a fourth set of features; and
  applying the neural network model to the fourth set of features to generate the category of the user.

2. The method of claim 1, wherein the first set of features includes a first number of features that is greater than a second number of features included in the second set of features.

3. The method of claim 2, further comprising:
  adjusting one or more parameters of the bloom filter in response to determining that the neural network model does not satisfy the predetermine condition;
  applying the bloom filter with adjusted parameters to the first set of features to generate a fifth set of features, wherein the fifth set of features includes a third number of features different than the second number of features in the second set; and
  training the neural network model based on the fifth set of features.

4. The method of claim 1, further comprising:
  in response to a second search query, performing in a content database to identify a list of content items based on the second search query;
  for each of the content items, determining a score for the content item using the neural network model;
  ranking the content items based on scores associated with the content items; and
  generating a search result having the content items sorted based on the rankings.

5. The method of claim 4, wherein determining a score for the content item using the neural network model comprises:
  obtaining a fifth set of features associated with the content item;
  applying the bloom filter to the fifth set of features to generate a sixth set of features; and
  applying the neural network model to the sixth set of features to generate the score.

6. The method of claim 1, further comprising:
  performing a search in a content database based on the search query and the category of the user.

7. The method of claim 1, wherein information that the user intends to receive is determined based on the category of the user, and a type of content that is associated with the category of the user is searched.

8. A non-transitory machine-readable medium having instructions stored therein, which when executed by a processor, cause the processor to perform operations of training classification models, the operations comprising:
  receiving a first set of features at an input layer of a neural network model, each of the features in the first set being associated with a predetermined category;
  applying a bloom filter coupled between the input layer and a first hidden layer of the neural network model to the first set of features to generate a second set of features, each of the features in the second set representing a combination of two or more features in the first set, wherein a number of nodes in the first hidden layer is fewer than a number of nodes in the input layer;
  training a neural network model by applying the second set of features to the first hidden layer of nodes of the neural network model to generate an output, the neural network model including a plurality of layers of nodes coupled to each other via a connection;
  comparing the output of the neural network model with a target value associated with the predetermined category to determine whether the neural network model satisfies a predetermined condition,
  wherein the neural network model together with the bloom filter is used to determine a category of a user based on a search query received from the user for content delivery, including
  obtaining a third set of features based on the search query, device information of a user device, and user information of the user;
  applying the bloom filter to the third set of features to generate a fourth set of features; and
  applying the neural network model to the fourth set of features to generate the category of the user.

9. The non-transitory machine-readable medium of claim 8, wherein the first set of features includes a first number of features that is greater than a second number of features included in the second set of features.

10. The non-transitory machine-readable medium of claim 9, wherein the operations further comprise:
  adjusting one or more parameters of the bloom filter in response to determining that the neural network model does not satisfy the predetermine condition;
  applying the bloom filter with adjusted parameters to the first set of features to generate a fifth set of features, wherein the fifth set of features includes a third number of features different than the second number of features in the second set; and
  training the neural network model based on the fifth set of features.

11. The non-transitory machine-readable medium of claim 8, wherein the operations further comprise:
in response to a second search query, performing in a content database to identify a list of content items based on the second search query;
for each of the content items, determining a score for the content item using the neural network model;
ranking the content items based on scores associated with the content items; and
generating a search result having the content items sorted based on the rankings.

12. The non-transitory machine-readable medium of claim 11, wherein determining a score for the content item using the neural network model comprises:
obtaining a fifth set of features associated with the content item;
applying the bloom filter to the fifth set of features to generate a sixth set of features; and
applying the neural network model to the sixth set of features to generate the score.

13. The non-transitory machine-readable medium of claim 8, wherein the operations further comprise:
performing a search in a content database based on the search query and the category of the user.

14. The non-transitory machine-readable medium of claim 8, wherein information that the user intends to receive is determined based on the category of the user, and a type of content that is associated with the category of the user is searched.

15. A data processing system, comprising:
a processor; and
a memory coupled to the processor, the memory storing instructions, which when executed by the processor, cause the processor to perform of training classification models, the operations including
receiving a first set of features at an input layer of a neural network model, each of the features in the first set being associated with a predetermined category,
applying a bloom filter coupled between the input layer and a first hidden layer of the neural network model to the first set of features to generate a second set of features, each of the features in the second set representing a combination of two or more features in the first set, wherein a number of nodes in the first hidden layer is fewer than a number of nodes in the input layer,
training a neural network model by applying the second set of features to the first hidden layer of nodes of the neural network model to generate an output, the neural network model including a plurality of layers of nodes coupled to each other via a connection,
comparing the output of the neural network model with a target value associated with the predetermined category to determine whether the neural network model satisfies a predetermined condition,
wherein the neural network model together with the bloom filter is used to determine a category of a user based on a search query received from the user for content delivery, including
obtaining a third set of features based on the search query, device information of a user device, and user information of a user;
applying the bloom filter to the third set of features to generate a fourth set of features; and
applying the neural network model to the fourth set of features to generate the category of the user.

16. The system of claim 15, wherein the first set of features includes a first number of features that is greater than a second number of features included in the second set of features.

17. The system of claim 16, wherein the operations further comprise:
adjusting one or more parameters of the bloom filter in response to determining that the neural network model does not satisfy the predetermine condition;
applying the bloom filter with adjusted parameters to the first set of features to generate a fifth set of features, wherein the fifth set of features includes a third number of features different than the second number of features in the second set; and
training the neural network model based on the fifth set of features.

18. The system of claim 15, wherein the operations further comprise:
in response to a second search query, performing in a content database to identify a list of content items based on the second search query;
for each of the content items, determining a score for the content item using the neural network model;
ranking the content items based on scores associated with the content items; and
generating a search result having the content items sorted based on the rankings.

19. The system of claim 18, wherein determining a score for the content item using the neural network model comprises:
obtaining a fifth set of features associated with the content item;
applying the bloom filter to the fifth set of features to generate a sixth set of features; and
applying the neural network model to the sixth set of features to generate the score.

20. The system of claim 15, wherein the operations further comprise:
performing a search in a content database based on the search query and the category of the user.

21. The system of claim 15, wherein information that the user intends to receive is determined based on the category of the user, and a type of content that is associated with the category of the user is searched.

* * * * *